UNITED STATES PATENT OFFICE.

MAX MAYER, OF BERLIN-TEMPELHOF, AND BÉLA HAVAS, OF BERLIN-SCHÖNEBERG, GERMANY, ASSIGNORS TO CHEMISCH-METALLURGISCHE INDUSTRIE GESELLSCHAFT MIT BESCHRANKTER HAFTUNG, OF BERLIN, GERMANY, A CORPORATION OF GERMANY.

ENAMEL AND PROCESS OF MAKING THE SAME.

1,220,253.

Specification of Letters Patent. Patented Mar. 27, 1917.

No Drawing. Application filed May 29, 1913. Serial No. 770,593.

*To all whom it may concern:*

Be it known that we, MAX MAYER and BÉLA HAVAS, a citizen of the German Empire and a subject of the King of Hungary, respectively, and residents, respectively, of Berlin-Tempelhof, Germany, and Berlin-Schöneberg, Germany, have invented certain new and useful Improvements in Enamels and Processes of Making the Same, of which the following is a specification.

It has heretofore been proposed that titanic acid might be used as an opaquing medium for white colored enamels and the suggestion was made to use pure calcined titanic acid alone for the ostensible purpose of producing a completely covering white enamel. The idea that titanic acid would cause the enamel to become not only opaque but also white in color was, however, found to be erroneous because instead of imparting a white color it made the enamel more or less yellow in appearance. It was then proposed that cobalt oxid be added to the titanic acid to produce a white color, according to the theory that the blue color of the cobalt would compensate the yellow color of the titanic acid and the resultant color would be white. This process (see German Patent No. 207,111) was found to be impracticable because of the extremely sensitive adjustment required with respect to the amount of cobalt oxid to be used relatively to the amount of titanic acid. It was only in the rarest cases and largely as the result of accident that a proper compensation of colors was had. Practically, therefore, the use of titanic acid in the sense of a substitute for tin oxid in the production of an opaque white enamel was found to be impossible. It was further suggested that the titanic acid salts of calcium and barium be employed but it was found that while calcium titanate produces a beautiful cream-colored enamel and barium titanate a yellow-white color neither resulted in the clear white so much desired. Furthermore barium titanate is commercially valueless for the purpose, because it cannot be used for the production of hygienic enamels, that is, such for example, as are safe for lining utensils used as containers for food.

From this résumé of the prior state of the art it will be seen that although much was expected of titanic acid as a means for bringing about an opaque white color in the enamel, no results of this kind were actually accomplished. The hope and expectation that titanic acid could be used for this purpose was frequently expressed but no method of getting the result has ever been described so far as we know.

We have now discovered that in spite of the apparently adverse experience with titanic acid as described, this acid will nevertheless produce the desired effect if it be suitably mixed with zirconium oxid. When accompanied by this oxid the titanic oxid will produce a beautiful enamel opaque and absolutely white in color throughout.

These ingredients or media for producing a white, opaque appearance are ground up in the usual manner with the coating enamel in the mill. Chemically they react only to a slight degree—not so as to injuriously affect any of the components of the enamel—so that in this respect the mixture of titanic acid (or oxid) and zirconium oxid may be called neutral. The manner in which these substances produce the cloudy effect seems to be very largely mechanical inasmuch as they are uniformly distributed in a state of very fine subdivision in the melt during the burning in of the enamel coating.

It is obvious that the substances to be used (titanic acid mixed with zirconium oxid) must be in such physical condition as will make them suitable for the purpose desired. The titanic acid, or titanium dioxid ($TiO_2$) provided it is practically free from iron, may contain silicic acid and also alkalis. The composition of the mixture of the two substances may vary to some extent in accordance with the constitution of the covering enamel which is employed. If desired, moreover, the above mentioned mixture may be glowed or calcined before use.

In place of zirconium oxid equivalent metallic compounds of the same character may be employed. For instance, a substance containing zirconium oxid may be used, containing for example 85% of zirconium oxid, some alkali, silicic acid and water of hydration. In some cases tin oxid, a member of the titanium group may be used as a substitute or equivalent of zirconium oxid.

The use of a mixture of titanic acid and zirconium oxid, as described, is commercially valuable as producing not only superior effects but with substances which are materially cheaper to produce than those heretofore used in connection with such white enamels as this application contemplates.

The following example is given to show specifically the composition of an enamel suitable for producing the white, opaque effect in accordance with our invention, it being understood, of course, that these examples are merely illustrative and are not to be regarded as limiting our invention.

*Example.*

The body of the enamel is prepared according to the usual practice and under well understood conditions by melting together the following ingredients in proportions about as follows:

| | |
|---|---|
| Borax | 20.5 kg. |
| Feldspar | 30.4 kg. |
| Quartz | 19.7 kg. |
| Soda | 8.0 kg. |
| Saltpeter | 2.7 kg. |
| Cryolite | 16.0 kg. |

To this melted enamel during grinding in the mill, and for each 100 kg. of the same, are added 7 kg. of enamel clay and 6 kg. of the opacity medium, the latter consisting of a mixture of 1½ kg. of titanic acid and 4½ kg. of zirconium oxid. As described, the opacity medium may be previously heated and the zirconium constituent replaced in about the same quantities given in the example by an oxid of the titanium group, such as tin oxid or a composition containing about 85% of zirconium oxid, the compound being free from iron.

In the claims the expression "a titanic oxid" is intended to include the hydrated as well as the anhydrous oxid and the expression "zirconium oxid" embraces the variants or equivalents of the same.

We claim:

1. That improvement in the art of producing an opaque white enamel, which consists in adding to the enameling material a mixture of a titanic oxid with zirconium oxid.

2. That improvement in the art of producing an opaque white enamel, which consists in adding to the enameling material a mixture of a titanic oxid with a suitable substance containing zirconium oxid.

3. An opaque white enamel comprising, as the medium for producing white opacity, a mixture of a titanic oxid with zirconium oxid.

In testimony whereof, we have hereunto set our hands in the presence of two subscribing witnesses.

MAX MAYER.
BÉLA HAVAS.

Witnesses:
HENRY HASPER,
WOLDEMAR HAUPT.